(12) United States Patent
Zhou et al.

(10) Patent No.: US 8,374,979 B2
(45) Date of Patent: Feb. 12, 2013

(54) FAST IMAGE PARSING BY GRAPH ADAPTIVE DYNAMIC PROGRAMMING (GADP) PERFORMING CLASSIFICATION, DETECTION, AND SEGMENTATION SIMULTANEOUSLY

(75) Inventors: Xi Zhou, Champaign, IL (US); Jinjun Wang, San Jose, CA (US); Fengjun Lv, San Jose, CA (US); Kai Yu, Santa Clara, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 424 days.

(21) Appl. No.: 12/814,449

(22) Filed: Jun. 12, 2010

(65) Prior Publication Data

US 2011/0116708 A1    May 19, 2011

Related U.S. Application Data

(60) Provisional application No. 61/262,335, filed on Nov. 18, 2009.

(51) Int. Cl.
*G06F 15/18* (2006.01)
(52) U.S. Cl. ........................................................ 706/12
(58) Field of Classification Search .................... 706/12, 706/45, 62; 382/155, 173, 180, 181, 190, 382/224
See application file for complete search history.

(56) References Cited

U.S. PATENT DOCUMENTS 7,657,126 B2 * 2/2010 Gokturk et al. ............... 382/305
7,660,468 B2 * 2/2010 Gokturk et al. ............... 382/224

OTHER PUBLICATIONS

Zhou, Joint Appearance and Locality Image Representation Gaussianization, 2010, University of Illinois, pp. 1-119.*
P. Felzenszwalb, et al., A discriminatively trained, multiscale, deformable part model. CVPR'08, 2008.
Z. Tu, et al., Image parsing: Unifying segmentation, detection, and recognition Interna tional Journal of Computer Vision 2005, pp. 113-140, 2005.
J. Shotton, et al., Semantic Texton Forests for Image Categorization and Segmentation. CVPR'08, 2008.
J.Winn, et al., The Layout Consistent Random Field for Recognizing and Segmenting Partially Occluded Objects CVPR'06, 2006.
L.J. Li, et al., Towards total scene understanding: Classification, annotation and segmentation in an automatic framework CVPR'09, 2009.
J. Uijlings, et al., What is the Spatial Extent of an Object? CVPR'09, 2009.

* cited by examiner

*Primary Examiner* — David Vincent
(74) *Attorney, Agent, or Firm* — Joseph Kolodka; Bao Tran

(57) ABSTRACT

Systems and methods are disclosed to perform image parsing on one or more images by identifying a set of similar regions from each image; assigning one or more region labels to each region and generating multiple hypotheses for region label assignment; and detecting class, location and boundary of each object in the image, wherein object classification, detection and segmentation are performed jointly during image parsing.

20 Claims, 3 Drawing Sheets input: $p(x_i|s_i), p(s_i|s_{i-1})$
output: Optimal path $(i_1, i_2, \ldots, i_M)$
 1: for $k = 0$ to $K$ do {Initialization}
 2:     $\varphi_0(k) \leftarrow 0$,
 3: end for
    {Recursion}
 4: for $k = 0$ to $K$ do
 5:     for $m = 0$ to $N - 1$ do
 6:         $\varphi_{m+1}(k) \leftarrow \min_{1 \leq l \leq K}[\varphi_m(l) + \zeta_m(l, k)]$
 7:         $\xi_{m+1}(k) \leftarrow \arg\min_{1 \leq l \leq K}[\varphi_m(l) + \zeta_m(l, k)]$
 8:     end for
 9: end for
    {Path backtracking}
10: $i_M \leftarrow \arg\min_{1 \leq k \leq K} \xi_M(k)$
11: for $m = M - 1$ to $1$ do
12:     $i_m \leftarrow \xi_{m+1}(i_{m+1})$
13: end for

FIG. 4

FAST IMAGE PARSING BY GRAPH ADAPTIVE DYNAMIC PROGRAMMING (GADP) PERFORMING CLASSIFICATION, DETECTION, AND SEGMENTATION SIMULTANEOUSLY

This application claims priority to U.S. Provisional Application Ser. No. 61/262,335 filed Nov. 18, 2009, the content of which is incorporated by reference.

BACKGROUND

The present invention relates to image parsing.

Typical natural images contain multiple regions with each image region being a set of pixels grouped based on homogeneity in terms of location, appearance and smoothness constraint. The image parsing process gives object labels to image regions so that the most probable interpretation of the input image can be achieved. It also provides information such as shape (where is its boundary), semantics (what is the probability of the region belonging to each object class) and context (who are neighboring regions). Image parsing functionality is one of the most important features in the human visual system (HVS) because it provides necessary support to higher-level understanding of the physical world by human brain. The image parsing process gives labels to image regions, as well as information including shape, semantics and context. Although it is one of the most important features in the human visual system, automatic image parsing using computer vision techniques remains difficult due to computational issues.

Traditional computer vision techniques regard image classification, detection and segmentation as separate tasks and have developed different approaches for each respective task. However, apparently good results from these tasks can be mutually beneficial to each other, and cognitive studies have shown that human visual system performs these tasks simultaneously, therefore a joint approach to the three tasks is more appealing and effective.

In parallel, Dynamic Programming (DP) is a well studied tool for solving sequential decision problems in an efficient way. It performs global optimization by locally optimizing a sub-problem. One typical scenario where DP has been extensively used is to find the optimal sequence of a fix number of moves, starting from point i and ending at point j, with associated cost $\phi(i, j)$. However, applying DP algorithm to the searching problem in image parsing opens to two challenges: First, due to the nature of image, the topology of image units is more complicated than a sequential connection; Second, due to the existence of multi-mode, simply taking the top-N solutions by DP as the hypotheses is not feasible, because these hypotheses are usually too similar to each other as observed in our experiment, which means that they fall into the same mode.

SUMMARY

In one aspect, systems and methods are disclosed to perform image parsing on one or more images by identifying a set of similar regions from each image; assigning one or more region labels to each region and generating multiple hypotheses for region label assignment; and detecting class, location and boundary of each object in the image, wherein object classification, detection and segmentation are performed jointly during image parsing.

Implementations of the above aspect may include one or more of the following. The assigning the region labels can include applying an algorithm called Graph Adaptive Dynamic Programming (GADP). The GADP minimizes an objective function $$\hat{S} = \underset{S \in \Omega}{\operatorname{argmin}} \sum_{i=1}^{N} \zeta_i(s_i \mid S_i^p)$$

where $$\zeta_i(s_i \mid S_i^p) = -\log(p(x_i \mid s_i) p(s_i \mid S_i^p))$$

$X=[x_1, x_2, \ldots x_N]$ being a set of N image regions and $S=[s_1, s_2, \ldots, s_N]$ being a state array of a corresponding region and a state space $s_i \in S=\{0, 1, \ldots, K\}$ where $s_i=0$ indicates a background category with K foreground categories. The method includes assigning probabilities of each region belonging to each object class as a basis for label assignment for each region; and optimizing the label assignment so that an overall assigning probability for all regions is maximized. The method can perform an initial region label assignment using dynamic programming. A hierarchical image analysis can be done to parse the image into three level of patches including a first level where pixels are grouped into super pixels based on similarity, a second level where the GADP groups the super-pixels into regions; and a third level where multiple hypotheses of region combinations are analyzed by a multi-class support vector machine (SVM). Image segmentation can be applied to the image and reducing the number of elements to be processed to a small number of regions. The same object label can be applied to adjacent homogenous pixels. Each region can have a set of pixels grouped based on similarities including adjacency, color and smoothness. The method can encode each region with information including shape (boundary) and context (neighboring regions).

Advantages of the preferred embodiments may include one or more of the following. The system provides a unified framework to solve the following three visual recognition tasks simultaneously:

object classification, i.e. to predict presence/absence of a specific object class in the image;

object detection, i.e. to predict a bounding box of each presented object;

object segmentation, i.e. to predict a precise boundary of each presented object.

The unified framework can solve the above three visual recognition tasks simultaneously, which considerably reduces the complexity and cost of developing different methods for each respective task. Under this joint framework, the recognition accuracies of all three tasks are also significantly improved because when performed jointly, results from these tasks can be mutually beneficial to each other.

The system provides high performance in handling image parsing. This is achieved because the search model is efficient to support large search space. The search space that can be handled includes unconstrained shapes. The system can handle multiple categories labeling simultaneously. The search process can handle multi-mode issue in the image parsing. To search for the joint interpretation of multiple image regions, the parsing process provides good global or near global solution. The search method imposes fewer constraints on modeling the images.

BRIEF DESCRIPTION OF THE DRAWINGS

FIG. 4 shows an exemplary pseudo code for a Graph Adaptive Dynamic Programming system in one embodiment of the present invention.

DESCRIPTION

Figure 1:
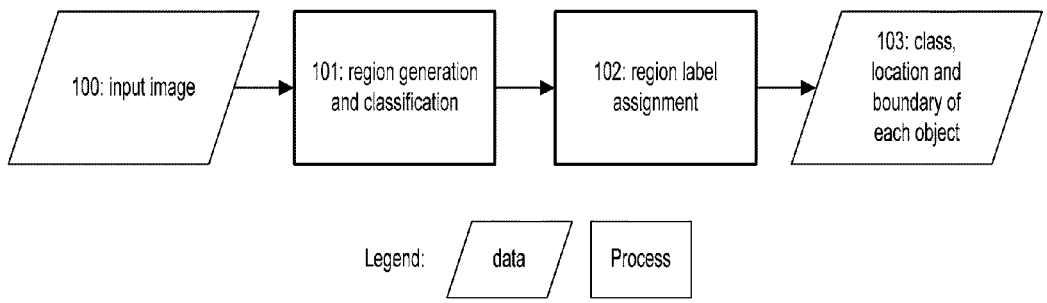
FIG. 1 shows a diagram of a fast image parsing system.

FIG. 1 shows a diagram of fast image parsing system where input image is received by block 100. In block 101, the system performs region generation and classification. In block 102, the system performs region label assignments, and in block 103, the system determines the class, location and boundary of each object.

Figure 2:
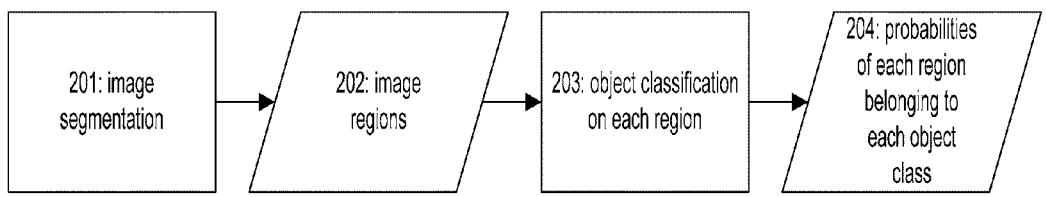
FIG. 2 shows in more details a region generation and classification block in FIG. 1.

FIG. 2 shows in more details the operation of block 101. The process performs image segmentation in block 201. Block 201 applies image segmentation to the original input image and reduces the number of elements that need to be assigned from millions of pixels to only a few hundreds of regions. It also guarantees that the same object label will be adjacent homogenous pixels. This approach not only significantly speeds up the entire process, but also ensures a clean and smooth boundary around the detected objects.

The process retrieves one or more image regions in block 202. Object classification is done for each image region in block 203. Block 203 computes the assigning probabilities of each region belonging to each object class. This is the basis for label assignment for each region and the goal is to find an assignment so that the overall assigning probability for all regions is maximized. In block 204, the process assigns probabilities that each region belongs to particular object class.

Figure 3:
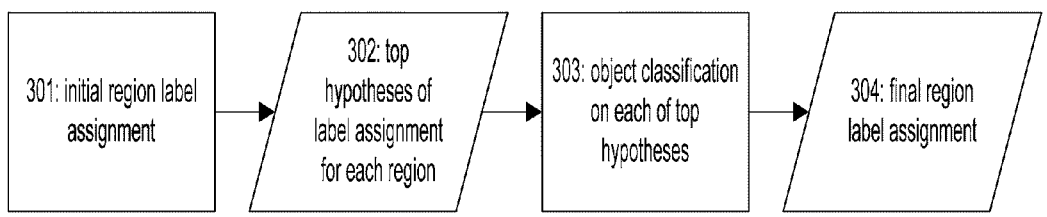
FIG. 3 shows in more details a region label assignment block in FIG. 1.

FIG. 3 shows block 102 in more details. First, an initial region label assignment is done in block 301. Block 301 applies an efficient dynamic programming algorithm to avoid brute-forth search, which guarantees a desirable system speed while maintaining sufficient variety to avoid local optima. Next, top hypotheses of label assignments are provided for each region in block 302. In block 303, the object classification is tested on each of the top hypotheses. In block 304, a final region label assignment is done.

The adaptive dynamic programming process is used which takes into account not only regions themselves but also the contextual relationship among regions to significantly reduce the search space. The process searches for truly promising solutions while maintaining sufficient variety to avoid local optima. The system verifies multiple hypotheses of region assignment by examining each hypothesis against a trained multi-class object classifier, which provides an object-level assurance of correct grouping of regions into objects.

The system performs object classification, detection and segmentation jointly as an image parsing problem. In this system, each image consists of a set of parts called regions. Each region is a set of pixels grouped based on similarities such as adjacency, color and smoothness. It also encodes information such as shape (where its boundary is) and context (who are neighboring regions).

Image parsing is a process to assign object labels to each region so that the most probable interpretation of the input image can be achieved. Once the labels are assigned, regions can be grouped into objects. Classification, detection and segmentation can be achieved simultaneously.

By grouping pixels into regions, the system significantly reduces the number of elements that need to be assigned from millions of pixels to only a few hundreds of regions. However, finding the optimal region assignment can still be a formidable problem. Suppose we have N regions and K object classes (plus one background class), there are (K+1) to the power of N possible combinations, which makes a brute-force approach infeasible.

One embodiment of the system models an image as set of regions and uses a hypotheses generation algorithm to get possible image parsing solutions for final re-scoring. The hypotheses generation process, called Graph Adaptive Dynamic Programming (GADP), handles large search space efficiently and gives good parsing hypotheses for testing. With such capacity, the system can apply more precise and complex image models to achieve better performance. In addition, our system can perform image segmentation, detection and classification simultaneously.

The hierarchical image analysis framework parses any image into three levels of patches to support all the three tasks. At the bottom level, pixels are grouped into superpixels based on similarities. At the middle level, a graph adaptive dynamic programming is proposed to group superpixels into structures that we called regions. Finally at the top level, multiple hypotheses of region combination are explored and determined by a multi-class SVM. This unified approach provides the system with object types, object locations and object boundaries at the same time.

In one embodiment, to do image parsing, the system groups pixels into regions to reduce the number of processing elements from millions of pixels to only a few hundreds of regions. Then a graph adaptive dynamic programming (GADP) process is applied to generate high-quality parsing hypotheses that satisfy all the three above-mentioned requirements. GADP extends classical DP to optimize with graph structure and to create multiple hypotheses with adjustable variety.

GADP takes into account not only regions themselves but also the contextual relationship among regions to significantly reduce the search space. GADP assigns object label to each region and generate multiple hypotheses of region label assignment. GADP is highly efficient and robust because it only searches for truly promising solutions while maintaining sufficient variety to avoid local optima. In this way, the system can incorporate more precise and complex object models to achieve superior performance. In addition, since the system handles the image parsing problem directly, the results can be utilized by the classification, detection and segmentation tasks in an uniform way.

In GADP, $X=[x_1, x_2, \ldots x_N]$ is the set of N image regions and $S=[s_1, s_2, \ldots, s_N]$ is the state array of the corresponding region. A state space can be specified $s_i \in S=\{0, 1, \ldots, K\}$ where $s_i=0$ indicates the background category, and the rest indicates the K foreground categories. Then the image parsing task strives to find the optimal interpretation $\hat{S}$ that maximizes $p(S|X)$. Under the Bayesian framework, $$\hat{S} = \underset{\tilde{S} \in \Omega}{\mathrm{argmax}}\, p(S \mid X) = \underset{\tilde{S} \in \Omega}{\mathrm{argmax}}\, p(X \mid S) p(S), \qquad (1)$$

where $p(X|S)$ specifies the generative likelihood from S to X, and $p(S)$ refers to the prior probability of the states array.

Regions obtained from the low-level modules are converted into a graph in the following way: Each node in the graph represents an image region $x_i$, and two nodes are connected if their corresponding regions are adjacent. Assuming the total number of nodes is N, each node is numbered according to the area of its corresponding region in descending order, i.e., larger region gets smaller index number. Next, the set of nodes connected with node i is denoted as $S_i$, i=1, ... N. The set is split into two parts, the subset of nodes whose numbers are less than i is denoted as $S_i^p$, and the subset of nodes with numbers larger than i as $S_i^f$.

According to chain rule, Eq. (1) expands as:

$$S = \underset{\vec{S} \in \Omega}{\operatorname{argmax}} \prod_{i=1}^{N} p(x_i \mid s_i) p(s_i \mid s_1, \ldots, s_{i-1}) \qquad (2)$$
$$= \underset{\vec{S} \in \Omega}{\operatorname{argmax}} \prod_{i=1}^{N} p(x_i \mid s_i) p(s_i \mid S_i^p)$$

The likelihood $p(x_i|s_i)$ forms a K by N matrix, where the $m^{th}$ column represents the likelihoods of the $m^{th}$ node given different states. Then, taking the negative log-likelihood $$\zeta(s_i \mid S_i^p) = -\log(p(x_i|s_i)p(s_i|S_i^p)) \qquad (3)$$

as the cost, the optimization aims at minimizing the following overall objective function:

$$\hat{S} = \underset{S \in \Omega}{\operatorname{argmin}} \sum_{i=1}^{N} \zeta(s_i \mid S_i^p) \qquad (4)$$

Similar to classic DP, to solve Eq. (4), GADP recursively optimizes a sub-problem from node 1 to m. In each iteration m is increased and the whole process stops when m=N. For each sub-problem, $$\varphi_m(k) = \sum_{i=1}^{m} \xi(s_i = k \mid S_i^p)$$

represents the cost from node 1 to node m on state k, m=1, ..., N, the GADP algorithm is illustrated in FIG. 4.

As explained above, in addition to generate hypothesis efficiently, the system further requires multiple hypotheses with certain variation between each other to cover enough search space. In order to generate multiple hypotheses with significant difference, GADP is run for several turns. In each turn, the top best path is taken and the likelihood matrix $p(x_i|s_i)$ is adaptively updated according to current and all previous paths. By changing $p(x_i|s_i)$, GADP has to consider different path to give multiple distinguishing hypotheses in an adjustable way. To illustrate, for each nodes, the likelihood of the currently selected states is set to zero so as to force the DP process to reconsider another path in successive runs. By controlling how many nodes to be changed, the system can adjust the diversity of the solved pathes by GADP. The more nodes being reset, the larger diversity the finally generated hypothesis will be. This strategy significantly improves the quality of generated object hypotheses.

The cost function used in Eq. (2) contains two terms. The first term $p(x_i|s_i)$ indicates the likelihood of feature vectors given current state, and the second term $p(s_i|S_i^p)$ represents the transition probability of current state given the seen state array. The first term is calculated by $$p(x_i \mid s_i) = \frac{p(s_i \mid x_i) p(x_i)}{p(s_i)} \qquad (5)$$

where $p(s_i|x_i)$ is a pseudo-posterior obtained by a "region scoring" module.

$p(S_i|s_i)$ can be learnt from the training set by simply counting. For example, $p(S_i$="Same"$|s_i$="Car") can be learnt by counting how many times in the training set a region with label "Car" with all surrounding regions having label "Car" also.

For the Region Generation module, since pixels in neighboring regions are very alike, it is highly redundant to perform parsing at the pixel level. The module groups similar pixels together to form a region which is the basic processing unit. A commercial software called VectorMagic is used and for an image with size of, this typically generates about 100 regions.

The Region Scoring module obtains a probability of every region into one of the predefined categories. The module only considers local observation from each region. A Hierarchical Gaussianization (HG) image representation is used to describe the appearance information of each region. Then a multi-class linear SVM is used to get the possibilities of the region being either of the categories. This becomes the input for the GADP algorithm for hypotheses generation.

In the Hypotheses Verification module, hypotheses generated by GADP is tested to get the final parsing result. The system first combines regions with the same hypothesized labels into a single object hypothesis. Then any single object hypothesis or a set of several disjoint hypotheses are re-scored by another multi-class linear SVM. Similar to "Region scoring", HG representation is used to describe the appearance information of each combination. Finally, the most probably parsing of the image is obtained.

It is possible to go one step further than the inter-object level analysis in the "Hypotheses Verification" module. This eventually comes to a "Global level" analysis where the whole image is interpreted together. In this module, the HG representation is again adopted to describe the appearance information of the whole image. Similarly, a third multi-class linear SVM is used to calculate the confidence score of the image being each of the categories.

In sum, one implementation hierarchically models an image into regions, proposes multiple region label assignment hypotheses, and scores each hypothesis to obtain the final parsing results. Particularly, to handel the large search space in the hypotheses generating step, the GADP process in used which both is highly efficient and gives good candidates. With such capacity, the framework is able to perform image segmentation, detection and classification simultaneously. Experimental results show that the instant technique achieves high performance in all the three tasks.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

Figure 5:
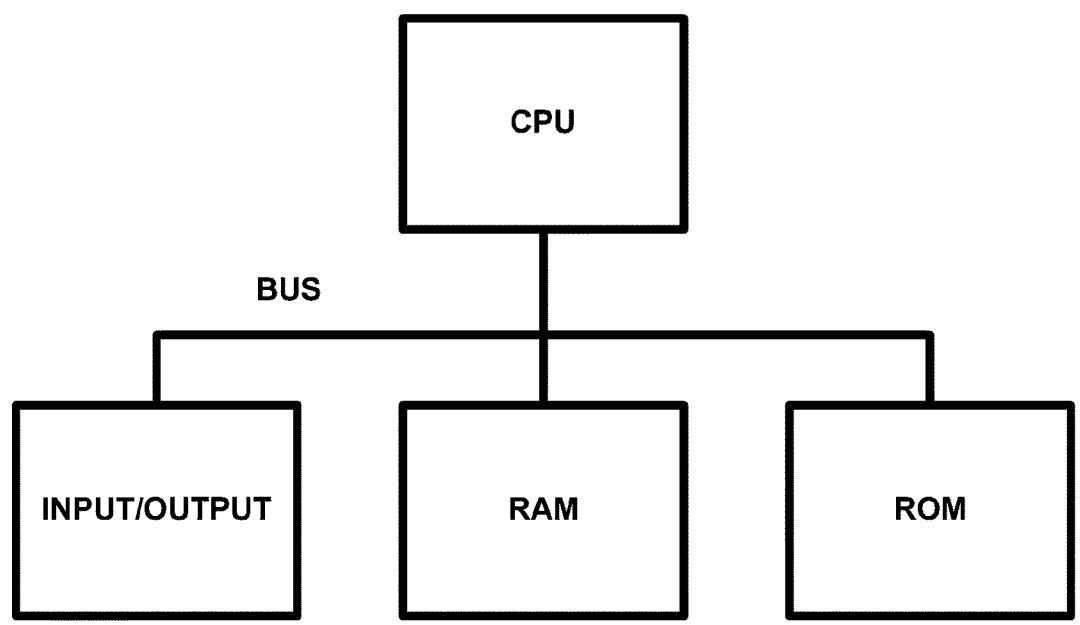
FIG. 5 shows an exemplary computer for image parsing.

By way of example, a computer with digital signal processing capability to support the system is discussed next. In FIG. 5, the computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A computer implemented method to perform image parsing on one or more images, comprising:
    identifying a set of similar regions from each image;
    assigning one or more region labels to each region and generating multiple hypotheses for region label assignment; and
    detecting class, location and boundary of each object in the image,
wherein object classification, detection and segmentation are performed simultaneously during image parsing.

2. The method of claim 1, wherein assigning the region labels comprises applying a graph adaptive dynamic programming (GADP).

3. The method of claim 2, comprising minimizing an objective function $$\hat{S} = \underset{S \in \Omega}{\operatorname{argmin}} \sum_{i=1}^{N} \zeta(s_i \mid S_i^p)$$

where $\zeta(s_i|S_i^p) = -\log(p(x_i|s_i)p(s_i|S_i^p))$ $X=[x_1, x_2, \ldots x_N]$ being a set of N image regions and $S=[s_1, s_2, \ldots, s_N]$ being a state array of a corresponding region and a state space $s_i \in S=\{0, 1, \ldots, K\}$ where $s_i=0$ indicates a background category with K foreground categories.

4. The method of claim 1, comprising
    assigning probabilities of each region belonging to each object class as a basis for label assignment for each region; and
    optimizing the label assignment so that an overall assigning probability for all regions is maximized.

5. The method of claim 1, comprising performing an initial region label assignment using dynamic programming.

6. The method of claim 1, comprising applying a hierarchical image analysis to parse the image into three level of patches including a first level where pixels are grouped into super pixels based on similarity, a second level where the GADP groups the super-pixels into regions; and a third level where multiple hypotheses of region combinations are analyzed by a multi-class support vector machine (SVM).

7. The method of claim 1, comprising performing image segmentation to the image and reducing a number of elements to be processed to a small number of regions.

8. The method of claim 1, comprising ensuring the same object label is adjacent homogenous pixels.

9. The method of claim 1, wherein each region comprises a set of pixels grouped based on similarities including adjacency, color and smoothness.

10. The method of claim 1, comprising encoding each region with information including shape (boundary) and context (neighboring regions).

11. An image parsing system, comprising:
    means for identifying a set of similar regions from each image;
    means for assigning one or more region labels to each region and for generating multiple hypotheses for region label assignment; and
    means for detecting class, location and boundary of each object in the image,
wherein object classification, detection and segmentation are performed simultaneously during image parsing.

12. The system of claim 11, wherein means for assigning the region labels comprises means for applying a graph adaptive dynamic programming (GADP).

13. The system of claim 12, comprising means for minimizing an objective function $$\hat{S} = \underset{S \in \Omega}{\operatorname{argmin}} \sum_{i=1}^{N} \zeta(s_i \mid S_i^p)$$

where $\zeta(s_i|S_i^p) = -\log(p(x_i|s_i)p(s_i|S_i^p))$ $X=[x_1, x_2, \ldots x_N]$ being a set of N image regions and $S=[s_1, s_2, \ldots, s_N]$ being a state array of a corresponding region and a state space $s_i \in S=\{0, 1, \ldots, K\}$ where $s_i=0$ indicates a background category with K foreground categories.

14. The system of claim 11, comprising
    means for assigning probabilities of each region belonging to each object class as a basis for label assignment for each region; and
    means for optimizing the label assignment so that an overall assigning probability for all regions is maximized.

15. The system of claim 11, comprising means for performing an initial region label assignment using dynamic programming.

16. The system of claim 11, comprising means for applying a hierarchical image analysis to parse the image into three level of patches including a first level where pixels are grouped into super pixels based on similarity, a second level where the GADP groups the super-pixels into regions; and a third level where multiple hypotheses of region combinations are analyzed by a multi-class support vector machine (SVM).

17. The system of claim 11, comprising means for performing image segmentation to the image and reducing a number of elements to be processed to a small number of regions.

18. The system of claim 11, comprising means for ensuring the same object label is adjacent homogenous pixels.

19. The system of claim 11, wherein each region comprises a set of pixels grouped based on similarities including adjacency, color and smoothness.

20. The system of claim 11, comprising encoding each region with information including shape (boundary) and context (neighboring regions).

* * * * *